United States Patent [19]

Fanuele

[11] Patent Number: 4,485,678

[45] Date of Patent: Dec. 4, 1984

[54] ROTOR DIAGNOSTIC AND BALANCING SYSTEM

[75] Inventor: Frank Fanuele, Albany, N.Y.

[73] Assignee: Mechanical Technology Incorporated, Latham, N.Y.

[21] Appl. No.: 423,503

[22] Filed: Sep. 27, 1982

[51] Int. Cl.³ ............................................... G01H 1/00
[52] U.S. Cl. ...................................... 73/660; 364/508
[58] Field of Search ........................ 73/658, 659, 660; 364/508

[56] References Cited

U.S. PATENT DOCUMENTS

| | | | |
|---|---|---|---|
| 2,361,990 | 11/1944 | Brown | 73/660 X |
| 2,377,349 | 6/1945 | MacKenzie | 73/660 X |
| 3,315,522 | 4/1967 | Frarey et al. | 73/660 X |
| 3,376,733 | 4/1968 | Trimble et al. | 73/660 X |
| 3,733,892 | 5/1973 | Rennick | 73/659 |
| 4,335,600 | 6/1982 | Wu et al. | 73/660 X |
| 4,352,293 | 10/1982 | Kurihara et al. | 73/660 X |

*Primary Examiner*—James J. Gill
*Attorney, Agent, or Firm*—Arthur N. Trausch, III; Joseph V. Claeys

[57] ABSTRACT

A system for rotor diagnostic and trim balancing which includes vibration and rotational sensors coupled to a processor providing outputs thereto whereby the processor is capable of generating a diagnostic output listing the basis and origin of the vibration based upon pre-established standards and if possible effect trim balancing of the rotor.

6 Claims, 3 Drawing Figures

ROTOR DIAGNOSTIC AND BALANCING SYSTEM

The Government of the United States of America has rights in this invention pursuant to contract No. F-33657-77-C 0468 awarded by Wright Patterson Air Force Base.

FIELD OF THE INVENTION

The present invention is directed towards providing a means of testing, analyzing and correcting rotor vibrations.

BACKGROUND OF THE INVENTION

A recurrent problem in the manufacture, testing, installation, and operation of rotating machinery is the need to balance the rotor. The balancing procedure involved is usually referred to as field balancing, trim balancing, or in-place balancing when performed in the test cell or in the final installation. Factory balancing in traditional low-speed machines usually involves general sensors (integral parts of the balancing machine) used to identify balance corrections in one or at most two locations along the rotor's shaft axis. However, in many devices in which rotors operate at high speeds, the ability and accuracy in determining and correcting vibrations due to an unbalanced rotor becomes more and more critical to satisfactory operation of the device. An important example of this is in commercial and military jet engine applications which utilize a single stage rotor or multiple-stage rotors. Periodically for safety and efficiency, the jet engine undergoes testing, and if necessary overhauling. The system testing involves determination of the actual levels of critical performance and operating parameters versus the allowable levels. Frequently, engine vibration levels which exceeds the allowable limits are detected. The rotor therefore must be trim balanced, that is, the synchronous vibration components of a trim balanceable rotor are reduced to a permissable level. If the rotor cannot be balanced by trim balancing techniques (i.e., due to lack of access to the area in need of trim balancing, rotor shift, misalignment etc.), the whole engine is returned to the final assembly area for corrective rework.

Such situations are true not only in jet engine applications but also in many others which involve complex machines and require a high degree of accuracy in the balancing of the rotor.

Regarding particularly however the example of jet engines, present procedures required for correcting excessive rotor vibrations are time consuming and lacking in precision. Trim balancing, a simple operation compared to finding and correcting other vibration problems, still takes approximately five hours. In this regard, if during the testing of the engine and rotor, it is found to have excessive vibrations, no matter where they originate, the operator will attempt to trim balance the engine and rotor by adding weights to the accessible portion of the rotor. The engines that cannot be trim balanced in this fashion are rejected and returned to the rework area. However, much time and effort is wasted in attempting to trim balance engines which, due to the nature of the unbalance, are not capable of being trim balanced. Moreover, since the nature of the unbalanced condition is not sufficiently ascertained, only a minimum amount of data is available to direct engine rework. Moreover, what data is available is determined by a testing operator and, therefore, subjective and highly dependent upon the experience of the operator. This results in additional and unnecessary time spent on reworking the engine to enable it to meet acceptable operating standards.

The already high cost of rotor testing and overhaul is ever increasing. Also, the present and increasing requirement for rapid turnaround of overhauled engines, particularly jet engines, has created a need for reducing the time and cost to test and overhaul engines, thereby increasing the availability of the engines for operation.

SUMMARY OF THE INVENTION

It is an object of the present invention to provide for a means of trim balancing and diagnosing vibrations in rotors, such as those used in aircraft engines, so as to reduce time and costs to test and overhaul such engines.

In this regard, the present invention provides for testing and trim balancing to be done in a relatively short period and to provide a diagnostic function which ascertains the probable cause of the vibration to expedite rework if necessary.

The present invention requires only the speed data and vibration signature of the rotor to evaluate the rotor's operation. Four basic predetermined criteria determine the cause of any vibrations. These criteria analyze the vibration data provided at various transient and steady state speeds by a plurality of vibration sensors or probes positioned on the engine casing about the rotor(s) (high and low pressure rotors may be involved in jet engines).

The first criteria determines the location of the maximum vibration by determining at what sensor location the strongest or highest vibration appears. For example, if the first of two vibration sensors is positioned at the compressor end of a rotor and the second at the turbine end, and if the first sensor showed high vibrations, the cause of the vibrations would probably be at the compressor end of the rotor.

A second diagnostic criteria involves transient measurement analysis, that is, for example varying the speed of the engine and rotor from idle up to full speed (just prior to the first critical speed to just beyond the second critical speed of the low pressure rotor), and back down again. If there is a discontinuous or abrupt change in vibration as the rotors' speed changes, this indicates a rotor shift.

The third criteria involves frequency domain analysis at different steady state speeds. This involves a spectrum analysis of vibration signal frame the rotor rotating at predetermined steady state speeds, so as to determine the frequency components of the vibration and their source.

The last criteria involves analysis of critical speed maps in which the rotor itself and the various components coupled to the rotor provide a maximum vibration at a select critical speed (which is usually predetermined by the manufacturer) for comparison to the theoretical. Misalignment rather than unbalance would be indicated by vibration frequencies at two times the expected frequency.

After accummulating the aforenoted data, it can be determined whether the unbalance is the type that can be corrected by trim balancing (i.e., unbalance in an accessible area and not due to rotor shifting, misalignment, etc.) Then a somewhat standard trim balancing technique would be performed. A history of the rotors' characteristics including predetermined influence coefficients for trim balancing (the predetermined parameters of the particular rotor type which indicates the balancing similarity) would be updated and stored for reference when performing future analysis of the rotor.

If unable to trim balance, the engine and rotor would be reworked with the above generated data indicating the probable cause of the vibrations, thus expediting the rework.

BRIEF DESCRIPTION OF THE DRAWINGS

The aforenoted objects, advantages and others will be realized by the present invention, the description of which is to be taken in conjunction with the drawings, wherein.

DETAILED DESCRIPTION OF THE PREFERRED EMBODIMENT

The present invention is directed towards first providing a diagnostic function to ascertain if the rotor of an engine can be trim balanced and second, if so, to trim balance it. With a large percentage of engines, however trim balancing is not effective or possible. Typically, this occurs when no trim balance locations are accessible without engine disassembly (such as the core of a turbofan), when the engine is not provided with trim balancing locations, or when the high vibration levels cannot be corrected by balancing alone such as where rotor shift or misalignment is involved. For these conditions, the diagnostic procedure of this invention is advantageous to identify the source of engine vibration, to minimize the trial-and-error in reworking and avoid multiple engine retest procedures. By isolating the sources of excess vibration, the system increases the productivity of testing and reduces the amount of fuel consumed during engine test. The end result is that more engines are available for service at reduced cost.

Figure 1:
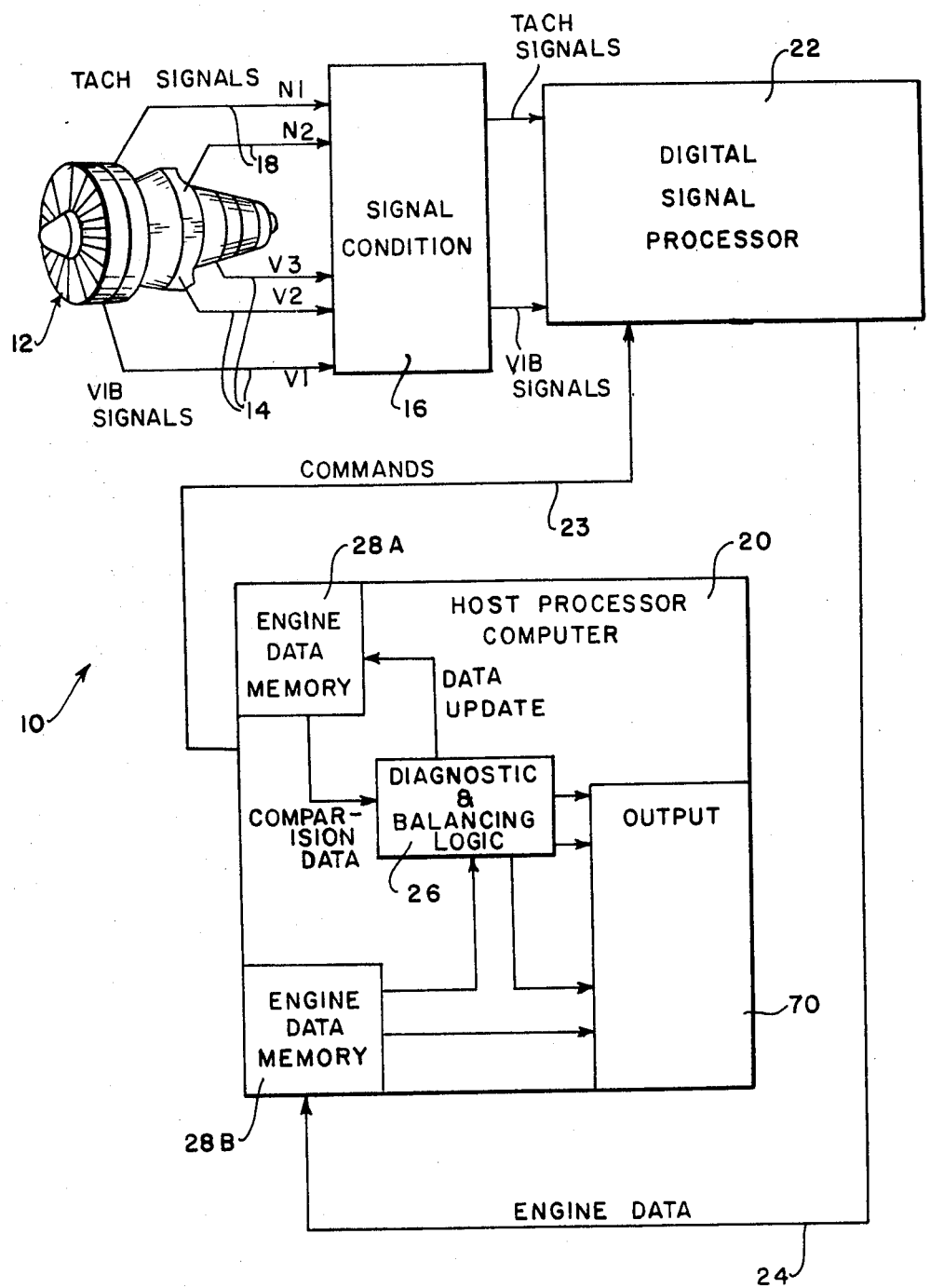
FIG. 1 is a block diagram of the system for performing rotor diagnostics and trim balancing, incorporating the teachings of the present invention.

With reference to FIG. 1, there is depicted the overall system 10 which is coupled to an engine 12 to be tested. The present system is particularly useful in analyzing a jet engine. Usually high and low pressure rotors are involved therein and as such will be used as an example throughout the disclosure herein. The present invention is not limited to jet engines but is applicable to all types of rotor or multiple-stage rotor applications.

In FIG. 1, a plurality of vibration pickup sensors 14 are provided. These sensors are coupled to a signal conditioner 16 and provide analog vibration signals thereto. The number of sensors and their location may vary. Consideration should be given to the dynamic characteristics and the theoretical responses of the particular rotor in choosing the number and location of the sensors needed. In the embodiment illustrated, three sensors ($V_1$, $V_2$, $V_3$) are mounted on the casing of the engine; $V_1$ adjacent the compressor end of the low pressure rotor, $V_3$ adjacent the low pressure turbine end; and $V_2$ in between $V_1$ and $V_3$ adjacent to the high pressure rotor.

Since a jet engine usually involves the use of two rotors, a low pressure rotor and high pressure rotor, monitoring the speed of the rotors requires two rotational speed sensors $N_1$ and $N_2$ respectively. The speed sensor outputs are similarly coupled to the signal conditioner 16, which converts the analog signals into digital signals.

A computer 20, which may be for example a Digital Equipment Corporation (DEC) VAX 11/780 processor is coupled to the signal conditioner 16 via a digital signal processor 22. Processor 22 may be for example a DEC PDP 11/03 CPU with a MOS memory such as the MSLL-64KB memory module, or any other equipment suitable for purpose. The digital signal processor 22 controls the acquisition and processing of data from the vibration and rotor speed sensors on the jet engine under test.

A programmable clock can be used in processor 22 to synchronize the rotor speed and the vibration data. This of course would be in addition to A/D (Analog to Digital) convertors, filters and other conventional apparatus for proper operation.

The particular signal processing functions of the processor 22 are controlled by command links 23. The data collected by the processor 22 is transmitted via data links 24 to the computer 20 for diagnostic purposes in its diagnostic and balancing logic section 26 and storage in the archive memory section 28A and/or memory 28B. Communication lines with the computer 20 may be serial RS-232 communication links or any other means suitable for the purpose.

Figure 2:
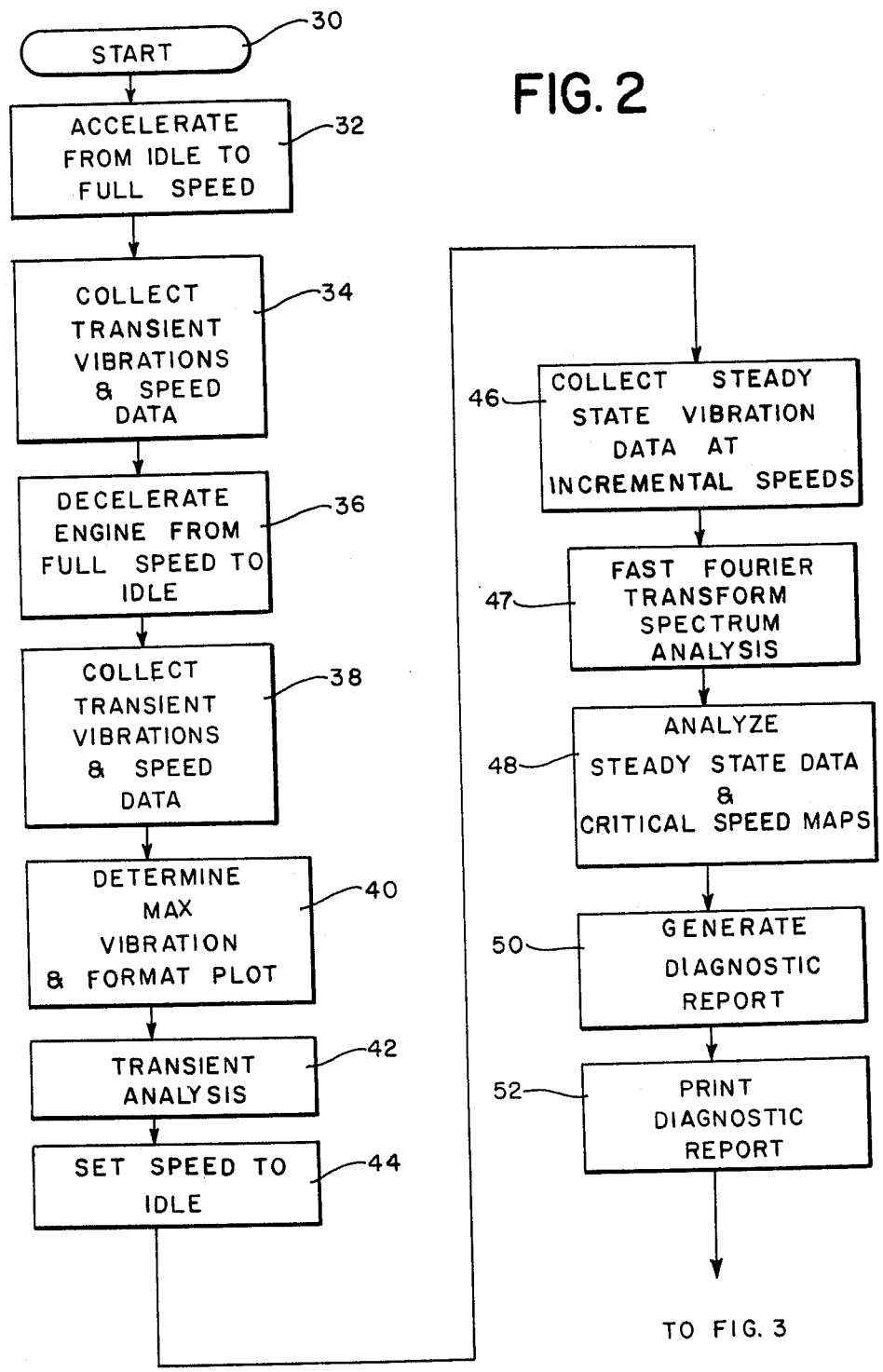
FIG. 2 is a block diagram flow chart of the steps involved in rotor diagnostics, incorporating the teachings of the present invention.
Figure 3:
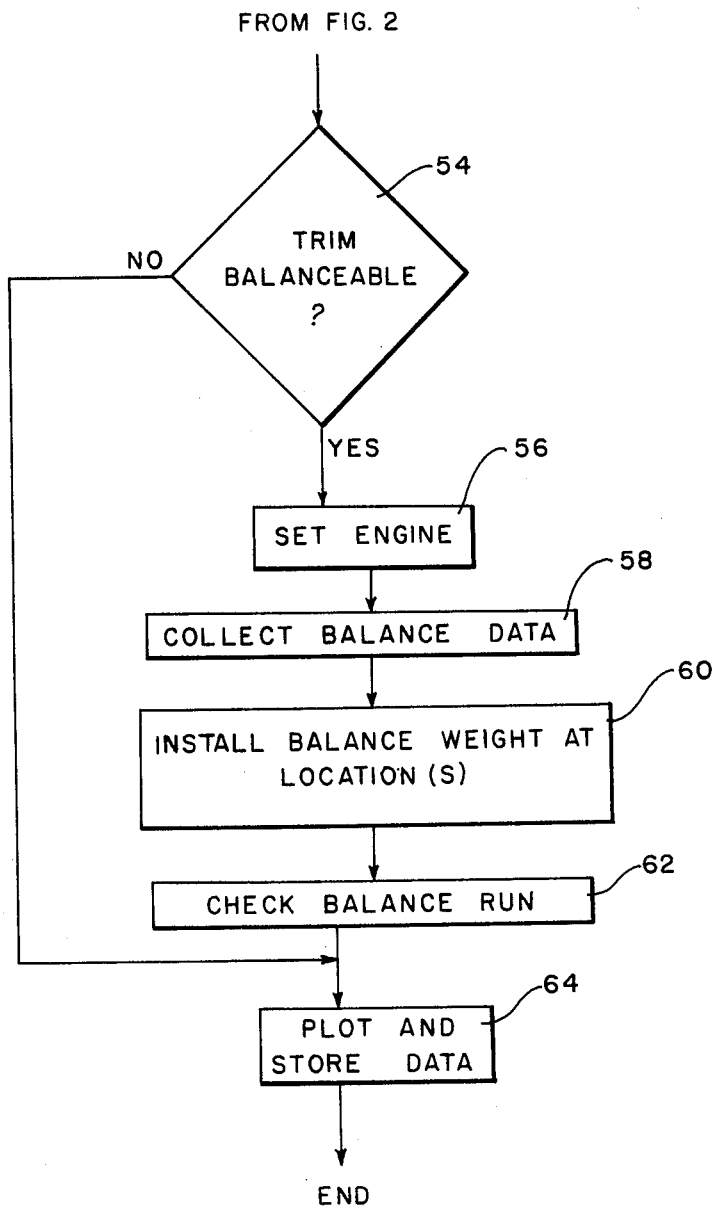
FIG. 3 is a block diagram flow chart of trim balancing a rotor, printout and storage of rotor data.

Consider the present invention's diagnostic procedure as shown by FIG. 2 which sets forth a representation flow diagram of the diagnostic analysis which would be performed by the diagnostic and balancing logic section 26 of the computer 20. This flow chart corresponds to the four basic criteria in the rotor diagnostic analysis.

The first of these criteria involves determining which sensor $V_1$, $V_2$, $V_3$ records the maximum vibration. At the start (30) of the engine test, the engine is accelerated from idle speed to full speed (32), with full speed being just after the second critical speed of the low pressure rotor. A reading would be taken at every 100 RPM interval as determined by the rotor speed sensors $N_1$ and $N_2$ which are synchronized by the clock. In this regard, a large set of data samples is acquired from each of the vibration sensors during a single revolution of each rotor. This is accomplished by synchronizing the acquisition of vibration sensor output using the programmable clock and the A/D converters.

During this run up the overall engine vibration would be determined. Additionally the frequency components within the raw signals from vibration sensors $V_1$, $V_2$, and $V_3$ that are synchronous (or identical) to the rotational frequency of the $N_1$ and/or $N_2$ rotors are determined. The data when determined (34) is then stored in temporary memory 28B. Similar data would then be accumulated as the engine decelerates from full speed to idle (36) with corresponding data accumulated (38) and fed into memory 28B.

This information is now analyzed (40) to determine the maximum vibration. Analysis will provide the speed at which the maximum overall vibration on each respective sensor is realized and the speed signal of $N_1$ and $N_2$ at which the maximum vibrations occur on each sensor, $V_1$, $V_2$, $V_3$. The specific type engine being tested pre-determines the proper speed range and the appropriate vibration sensors which should be analyzed over the operating speeds.

For the engine used as an example in this discussion, the $N_1$ rotor synchronous frequency component of the $V_1$ sensor is scanned for occurrence of a peak or maximum vibration over the speed range of engine operation. If the maximum vibration occurs, for example, in some predetermined range of the low pressure rotor such as approximately 7000 RPM to full speed then this indicates a low pressure rotor unbalance within its compressor stages. Similarly, if the maximum vibrations occurred between idle and approximately 7000 RPM, then this would indicate a change in flexibility of the low pressure rotor.

Likewise, the maximum vibrations on sensor $V_2$ are determined. If the maximum components that are synchronous with the $N_2$ rotor occur in the speed range of idle to approximately 10,000 RPM, then this indicates that the high pressure rotors turbine side is unbalanced. If the maximum vibration component that is synchronous with the $N_2$ rotor occurs in the speed range of 10,000 RPM to full speed, this would indicate unbalance at the high pressure rotor on its compressor side.

In the case of sensor $V_3$, if a maximum vibration component which is synchronous to the $N_1$ rotor occurs in the speed range of idle to 7000 RPM, this would indicate unbalance on the low pressure rotor's turbine side. A maximum vibration at $V_3$ in the range of 7000 RPM to full speed would point to a change in flexibility of the low pressure rotor.

The second criteria is transient measurement analysis (42). The vibrations at the sensors $V_1$, $V_2$, $V_3$ under the previously described transient (run up and run down) operating conditions are monitored for vibrations that change abruptly or discontinuously with an increase or decrease in speed. For example, a discontinuity of greater than 1.5 mils in the vibration at $V_1$ for a change of 200 RPM in speed sensor signal of $N_1$ would indicate a shift in the low pressure rotor at the compressor; a discontinuity at $V_3$ would indicate a shift in the low pressure rotor at the turbine; and at a discontinuity of greater than 1.5 mils at $V_2$ for a change of 200 RPM in the signal of $N_2$ would indicate a shift in the high pressure rotor.

Upon completion of this testing, the speed of the engine and rotors would be returned to idle (44) at which time if so desired, a display or other output (not shown) of the computer 20 may be provided of the data accumulated up to this point. The output 70 could take on a variety of forms such as video, graphic, hard copy, or standard line printer if so desired.

A third criteria is involved in the present system which is directed towards determining a spectrum analysis of the steady state data of the frequency domain of vibration and its components. A rotor behaves much differently in a transient state (that is when the speed is continuously changing) and a steady state (when it is run at the same speed for a time). Such a spectrum analysis of vibrations can be provided for example by a device manufactured by Hewlett Packard, entitled "Spectrum Analyzer" Model No. 5200. In this regard, once the idle speed is set, then the collection of steady state vibration data (46) begins. The speed of the engine and rotors is incrementally (7000, 8000, 9000 full RPM) brought up at fixed intervals of predetermined duration (approximately 3 min.) from idle to a maximum vibration speed. The amplitude of the vibration signals from the sensors $V_1$, $V_2$, $V_3$ at these predetermined speeds of the rotors are monitored to provide the frequency domain for the rotor's operation. In addition, the frequency of the signals are doubled since vibration due to misalignment would exist at twice the frequency of vibration due to unbalance. Additionally, accessory frequencies are monitored.

More particularly, with the engine and accessory frequencies known, during the steady state operation, the overall vibrations at sensors $V_1$, $V_2$ and $V_3$ are determined by a time-to-frequency Fast Fourier Transform (FFT) spectrum (47) to determine the spectrum contents and to extract the synchronous component amplitude and phase from the data signals.

The amplitude of each known component provides its contribution to the overall vibration and serves to identify the component and therefore the location from which the vibrations originate and accordingly whether they can be corrected.

If the amplitude of the vibrations due to the known components of the engine are subtracted from the overall vibrations $(V_1+V_2+V_3)$ and produce a result greater than zero, a seal rub would be indicated. If the overall doubled frequency of vibration due to unbalance $(2\times N_1)$ is greater than 0.5 mils, this would indicate a low pressure rotor misalignment. Similarly, if the overall vibrations at $3\times N_2$ are greater than 0.5 mils, this would indicate a high pressure rotor misalignment. If the vibration at the accessory frequency is greater than that calculated for the known group then this would indicate vibrations due to an unknown group.

Also, if at the maximum operating speed the maximum vibration exists this would indicate that the unbalance is at the compressor side of the rotors. If at the minimum operating speed the maximum vibration exists, the unbalance is indicated to be at the turbine side of the rotors. Since based upon this it is uncertain in a two rotor system which rotor is involved, reliance upon the other criteria is therefore necessary.

The last criteria is coupled to the previous frequency domain analysis and involves the use of critical speed maps (48) for the rotors and accessories, which are available from the manufacturers of the engines. These maps set forth the critical speeds for each component and accessory of the engine, that being the speed at which the vibration of the respective components would be a maximum.

The theoretical frequencies are used to identify actual measured vibration frequencies from the dynamic rotor performance. For example, if a measure component of the vibration had a frequency of 10,000 RPM and according to the critical speed map an oil pump coupled to the rotor has a maximum vibration at 10,000 RPM, this would indicate that there was an unbalance at the pump.

Once all of the foregoing data is accumulated then according to the parameters aforenoted, the diagnostic and balancing logic section 26 will generate an output (50) via the previous output to set forth the causes of the vibration in an order of greatest probability if so desired, an output report 52 of the same can be printed via a mechanical printer.

As can be seen, once basic rotor characteristics have been ascertained for the particular rotor, analysis of the possible defects due to rotor unbalance becomes effective in pin pointing the causes of the vibration.

At this point, a determination (54) is made whether the vibration is due to unbalancing which can be corrected by trim balancing. If correctable, then a somewhat convention trim balancing can proceed. If it can be corrected then the engine and low pressure rotor is set (56) at an appropriate speed (i.e, 8500 RPM). The vibration (amplitude and phase) at $V_1$ and $N_1$ is determined (58) and the predetermined influence coefficients already stored in storage 28A are used in a standard manner, such as the Sumiville Method, to calculate the balance weight to be used and the location that they are to be placed. Influence coefficients relate vibration amplitude at specific locations and speeds to the mass unbalance at a reference position. A data output via 70 is provided as to the placement of the appropriate balance weights (60).

After installation of the balance weights the engine and rotor would then be test run again (62) at 8500 RPMs to insure proper balancing. Lastly, the data generated would be in the form of an output (64) which would include, inter alia, acceleration, deceleration, and FFT plots for each of the sensors $V_1$, $V_2$ and $V_3$ along with the previously provided data as to the probable cause of the vibrations provided to the operator in printed form, video, or any other form including plots, with this data stored in the archive storage 28A along with previously generated data for this particular engine.

If the engine could not properly be trim balanced, then after a determination of what is causing the vibrations and a determination (54) is made not to trim balance then the test data is generated as an output (64) to enable a relatively quick and efficient reworking of the engine.

Thus by the foregoing invention its objects and advantages are readily realized, and although a preferred embodiment has been disclosed and described in detail herein, its scope should not be limited thereby rather its scope should be determined by that of the appended claims.

What is claimed is:

1. A method of providing data for use in diagnosing and balancing a rotor, comprising the steps of:
    (a) generating vibrational data from a plurality of vibration sensors positioned about a rotor during rotation of the rotor;
    (b) generating rotational data from rotational sensors corresponding to the rotation of the rotor;
    (c) synchronizing the vibrational data with the rotational data and determine the maximum vibration at respective vibration sensors as the rotor accelerates and decelerates at predetermined intervals;
    (d) providing means for comparing the maximum vibrational outputs from the vibration sensors with a predetermined standard to ascertain the probable location of and reason for the vibration sensed;
    (e) increasng and decreasing the rotor's rotation in a continuous fashion and monitoring the vibrational data for discontinuity of vibrational signals from the vibration sensors;
    (f) monitoring the steady state vibrational data as the rotors rotate at predetermined intervals generating a time-to-frequency spectrum of the components of the steady state vibrational data;
    (g) extracting from the spectrum the synchronous components thereof which correspond to predetermined critical speeds of the components of the rotor; and
    (h) providing means for generating a data output of the probable location and cause of vibrations in the rotor based upon the data obtained in steps d, e, f and g herein.

2. The method in accordance with claim 1 which further includes steps of providing means for determining if said rotor can be trim balanced and if so to determine the corrective weights and locations based upon the data obtained in steps d, e, f and g and predetermined influence coefficients for the particular rotor which are the parameters of the particular rotor which indicates balancing sensitivity.

3. The method in accordance with claim 2 which includes the steps of storing the data output of step h and the influence coefficients in memory.

4. A method of providing data for use in diagnosing and balancing low and high pressure rotors $R_1$ and $R_2$ respectively which are interposed between a compressor and turbine of a jet engine and the like comprising the steps of:
    (a) generating vibrational data from at least three vibration sensors during rotation of the rotor wherein one sensor is positioned adjacent $R_1$'s compressor side, the second sensor is positioned adjacent $R_1$'s turbine side, and the third sensor is positioned adjacent $R_2$ and each capable of picking up vibrations in the engine;
    (b) generating rotational data from rotational sensors corresponding to the rotation of the rotor, one rotational sensor being capable of monitoring the rotation of $R_1$, the second rotational sensor being capable of monitoring the rotation of $R_2$;
    (c) synchronizing the vibrational data with the rotational data and determine the maximum vibration at respective vibration sensors as the rotors accelerate and decelerate at predetermined intervals;
    (d) providing means for comparing the maximum vibrational outputs from the respective vibration sensors with a predetermined standard to ascertain the probable location of and reason for the vibration sensed;
    (e) increasing and decreasing the rotors' rotation in a continuous fashion and monitoring the vibrational data for discontinuity of vibrational signals from the respective vibration sensors;
    (f) monitoring the steady state vibrational data as the rotors rotate at predetermined intervals and generating a time-to-frequency spectrum of the components of the steady state vibrational data for the respective vibration sensor;
    (g) extracting from the spectrum the synchronous components thereof which correspond to predetermined critical speeds of the components of the rotors; and
    (h) providing means for generating a data output of the probable location and cause of vibrations in the rotors based upon the data obtained in steps d, e, f and g herein.

5. The method in accordance with claim 4 which further includes steps of providing means for determining if $R_1$ can be trim balanced and if so to determine the corrective weights and locations based upon the data obtained in steps d, e, f and g and predetermined influence coefficients for the particular engine, which are the parameters of $R_1$, which indicate balancing sensitivity.

6. The method in accordance with claim 5 which includes the step of storing the data output of step h and the influence coefficients in memory.

* * * * *

UNITED STATES PATENT AND TRADEMARK OFFICE
CERTIFICATE OF CORRECTION

PATENT NO. : 4,485,678

DATED : December 4, 1984

INVENTOR(S) : Frank Fanuele

It is certified that error appears in the above—identified patent and that said Letters Patent is hereby corrected as shown below:

Column 6, line 22, delete "3"
insert -2-

*Signed and Sealed this*

*Twenty-third* Day of *July 1985*

[SEAL]

Attest:

DONALD J. QUIGG

*Attesting Officer*      *Acting Commissioner of Patents and Trademarks*